United States Patent
Groux et al.

(10) Patent No.: US 6,207,213 B1
(45) Date of Patent: *Mar. 27, 2001

(54) FROZEN CONCENTRATED MILK AND PREPARATION THEREOF

(75) Inventors: Michel John Arthur Groux, Lauperswil; Gilles Fayard, Epalinges; Antonio Jimenez-Laguna, Lausanne, all of (CH)

(73) Assignee: Nestac S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 08/983,579

(22) PCT Filed: May 12, 1997

(86) PCT No.: PCT/EP97/02592

§ 371 Date: Jul. 13, 1998

§ 102(e) Date: Jul. 13, 1998

(87) PCT Pub. No.: WO97/43904

PCT Pub. Date: Nov. 27, 1997

(30) Foreign Application Priority Data

May 21, 1996 (EP) .................................. 96201352

(51) Int. Cl.$^7$ ...................................... A23G 9/00
(52) U.S. Cl. .................... 426/516; 426/565; 426/524
(58) Field of Search ................... 426/524, 516, 426/565

(56) References Cited

U.S. PATENT DOCUMENTS

| | | | |
|---|---|---|---|
| 813,375 | * 2/1906 | Glauser | 426/524 |
| 2,054,835 | * 9/1936 | Routh | 426/524 |
| 2,827,773 | 3/1958 | Detjen | 62/2 |
| 2,909,433 | * 10/1959 | Morrison | 426/524 |
| 3,456,839 | 7/1969 | Gilsenti | 222/70 |
| 3,914,440 | * 10/1975 | Witzig . | |
| 4,758,097 | * 7/1988 | Iles, Sr. | 366/149 |
| 5,024,066 | * 6/1991 | Goavec | 62/306 |
| 5,038,572 | * 8/1991 | DeBruijne et al. | 62/68 |
| 5,205,129 | * 4/1993 | Wright et al. | 62/68 |
| 5,215,777 | * 6/1993 | Asher et al. | 426/565 |
| 5,345,781 | * 9/1994 | Fels et al. | 62/343 |
| 5,370,893 | * 12/1994 | Carey | 426/565 |
| 5,713,209 | * 2/1998 | Hunchar et al. | 62/68 |
| 5,894,030 | * 4/1999 | Gibson et al. | 426/524 |
| 5,916,248 | * 6/1999 | Bravo | 62/68 |
| 5,919,510 | * 7/1999 | Fayard et al. | 426/565 |

FOREIGN PATENT DOCUMENTS 25 38 858 * 3/1977 (DE) .

OTHER PUBLICATIONS

Arbuckle, "Ice Cream", third edition, pp. 217, 240, 245–247, 1977.*

Arbuckle, "Ice Cream" p. 35, 1977.*

Patent Abstracts of Japan, vol. 5, No. 85 (C–57) [757], Abstract of Japanese Patent Document JP–A–56 029962 (1981).

* cited by examiner

Primary Examiner—Cynthia L. Nessler
(74) Attorney, Agent, or Firm—Vogt & O'Donnell, LLP

(57) ABSTRACT

Frozen concentrated milk is prepared by introducing a concentrated milk, such as a concentrated whole or skim milk, into the barrel of an apparatus for extrusion of a product which contains at least one screw which is rotated for transport of the concentrated milk through the apparatus barrel for extrusion of product through an extrusion apparatus product exit die, and during the transport of the concentrated milk through the extrusion apparatus, the concentrated milk is cooled to a temperature of equal to or lower than −8° C. to obtain, from the exit die, frozen concentrated milk.

21 Claims, 1 Drawing Sheet

FROZEN CONCENTRATED MILK AND PREPARATION THEREOF

CROSS REFERENCE TO RELATED PCT APPLICATION

Figure 1:
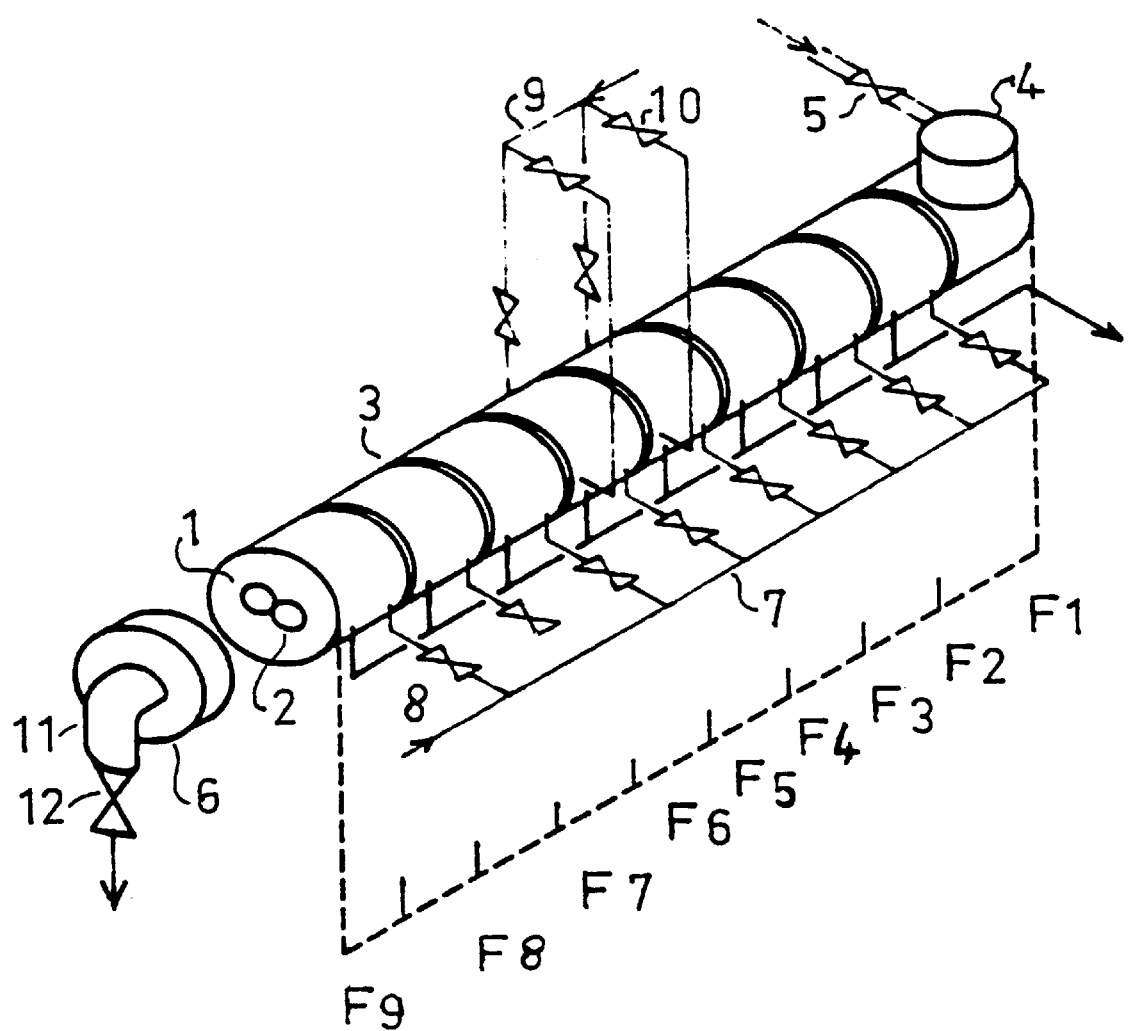

This application is a national stage application of International Patent Application PCT/EP97/02592 filed May 12, 1997.

BACKGROUND OF THE INVENTION

The present invention relates to processing concentrated milk, such as a whole or skim milk concentrated by evaporation or other means, and to preparation of a frozen concentrated milk, and thus, the present invention also thereby relates to procedures for freezing products, including milk and milk-based products, and the present invention further relates to use of extrusion equipment and procedures to prepare products.

Until now, it has not been possible to freeze evaporated or concentrated milk in a homogeneous form, i.e., without phase separation being observed in the process of cryoconcentration. Moreover, it has not been possible to freeze a milk concentrate in a form which can give a homogeneous diluted product on dilution with water.

SUMMARY OF THE INVENTION

The invention provides a frozen concentrated milk product, characterized in that it is not stabilized by the addition of a stabilizing agent or emulsifier and that it is in the form of a stable concentrate, the thawing of which leads to a homogeneous liquid.

The invention also provides a process for preparing a frozen concentrated milk characterized in that a concentrated milk containing, by weight, 20 to 40% dry matter is introduced into and transported through a device comprising at least one endless screw rotating in a barrel and cooled in the device to a temperature equal to or lower than –8° C. The concentrated milk employed and the frozen concentrated milk obtained are advantageously free from an emulsifying agent and from an agent for stabilizing the concentrated milk.

DETAILED DESCRIPTION OF THE INVENTION

In the context of the invention, a "concentrated milk" means a concentrate obtained by removing water from a raw material chosen from whole milk, milk skimmed to a varying extent, a product equivalent to skimmed milk such as buttermilk and mixtures thereof, a fermented milk and an acidified milk. To a further varying extent, in addition to processing concentrated milks, the process may be carried out with milk-based concentrated products chosen from cream and an acid cream and other milk-based concentrated products chosen from products of the yoghurt type, of sauces and of soups.

A product according to the invention may be sweetened or salted. It may be flavoured and contain flavourings or spices, for example culinary flavourings, fruit, coffee or cocoa flavourings.

Concentration may be carried out by any means, for example by cryoconcentration, osmotic evaporation, microfiltration, ultrafiltration with dilution or, for example by conventional evaporation.

In a particular embodiment, the concentrated frozen product contains an incorporated gas, for example air, i.e., it is expanded.

The concentrated milk of the present invention may be used directly, in particular as a decoration in a refrigerated desert or in an article of frozen confectionery. In this application, it is particularly advantageous that the product can be formed at the outlet from the extrusion die, that it is stable and that it retains its form during a period of time sufficient for it to be served without collapsing or deforming, for example when consumed.

In the particular case of frozen articles of confectionery, the shaping may be carried out by moulding in a container or by extrusion for example with a moveable extrusion die, reproducing the decorations normally achieved by the pastry maker with a piping nozzle. The stability of the shape obtained may be exploited to produce decorations which do not deform during the manufacturing process, in particular during packaging, or during storage.

Once diluted with water, an aerated product according to the invention may have the form of a milk shake containing a stable foam.

According to a preferred embodiment of the process, the raw material is passed through a device provided with two parallel endless screws, rotating in the same direction.

According to a particular embodiment, designed to produce a frozen concentrate for a foaming beverage of the milk shake type, a gas is injected, for example air, into the barrel in a quantity such that 20 to 150% expansion, and preferably 80 to 100% expansion, is obtained.

In order to put the process into practice, the starting material is milk, either whole or skimmed, fresh or reconstituted from powder and optionally cream or butter oil. It is pasteurized, cooled, and then, after preheating, is concentrated by evaporation. The concentrate may be homogenized, preferably hot, under intensive conditions enabling the mean size of the fat globules to be reduced to around 8–20 microns. A concentrate of sugar and flavourings may be optionally added by means of a blender. After cooling to a low temperature, preferably to 2–7° C., the mixture is introduced into a freezer, preferably a twin-screw freezer, for example such as illustrated in the the drawing FIGURE which accompanies this specification disclosure, in which it is mixed by co-rotating screws rotating at a high speed, preferably at 100–600 r.p.m., and optionally, conveyed to an air injection zone where it is expanded by 20–150%, and it is strongly cooled to –8 to –20° C., and then forced through a die.

Work in the twin-screw device is carried out without excessive shear, so that the increase in pressure does not exceed approximately 50 bar in the region of the and so that the product which emerges from the device is characterized by a mean ice crystal diameter of 10 to 34 microns, which is appreciably lower than that obtained with conventional freezers, and so that the product has a mean fat globule size of around 8–20 microns. The result is an improved texture in the sense of better oiliness and better creaminess.

BRIEF DESCRIPTION OF THE DRAWING FIGURE

The accompanying drawing FIGURE, illustrates an exploded diagrammatic perspective view of an apparatus device given by way of non-limiting example, for carrying out the process described above.

DETAILED DESCRIPTION OF THE DRAWING FIGURE

The apparatus illustrated in the accompanying drawing FIGURE for carrying out the process described above includes two identical parallel endless screws 1 and 2 in mesh with each other and which rotate in the same direction and which are driven by a motor (not shown). The screws 1 and 2 are aligned longitudinally in parallel in the barrel 3, which has at one of its ends, a pipe 4 for supplying the mixture to be frozen and which is provided with a non-return valve 5 to ensure air tightness, and placed at the other end is a die 6 in the form of a plate.

Optionally, the device includes means for feeding in air in an intermediate zone.

The two endless screws may have successive segments F1 to F9 where the form of the screw varies from one segment to another, for example from the point of view of the orientation of the threads and their pitch. The configuration of the screws is arranged so as to carry out operations for transporting, mixing, shearing and compressing the mass through the die and to encourage, optionally, the incorporation of gas so as to obtain good expansion. It is possible to provide intermediate mixing zones, for example, using mono-lobe or bi-lobe discs with a positive orientation, having a transporting effect or with a negative orientation having a return effect or having a segment with an inverse screw pitch inducing a return.

The barrel 3 is provided with means for cooling, consisting of a jacket through which cooling fluids circulate.

The means of cooling preferably include one self-contained cooling circuit 7 per segment, with valves 8 controlling the flow rate of the cooling agent, for example a water-alcohol mixture, which enables the temperature of each segment to be regulated individually. The screws may also be cooled in a controlled manner, for example by means of a cooling fluid circuit which can be controlled in a self-contained manner.

The gas, for example air, may be injected by means of flow meters through pipes 9 at different regions of the barrel 3, preferably in the second half of its length, and preferably from either side thereof. The air flow rate may be regulated individually by the valves 10. In this way, 80 to 150% expansion may be achieved.

The die is preferably in the form of a counter-cone, the function of which is to join the spaces surrounding each screw in a single outlet orifice. It may have a horizontal or vertical outlet. The geometry and dimensions of the die, or as the case may be, the diameter and length of the outlet pipe, which may be associated therewith, are designed to ensure a counter-pressure of the order of from 4 to 50 bar and preferably from 4 to 25 bar. The counter-pressure may be regulated by means, for example, of a ball valve downstream from the pipe in question, for example in the case of an outlet temperature for the product close to the lower limit, in which case the diameter of the outlet pipe should be increased to compensate for the fall in pressure due to the loss of charge caused by the increase in viscosity when the temperature of the mass falls. The die may preferably be cooled, for example by means of a sleeve through which a cooling fluid flows.

EXAMPLES

The process according to the invention is described in greater detail in the examples given hereinafter by way of illustration. The percentages and parts are by weight unless stated to the contrary.

Example 1

A skimmed milk was pasteurized and then introduced at 25° C. into an evaporator where it was concentrated to 30% dry matter.

This concentrate was introduced into a twin-screw extruder, the barrel of which had nine 100 mm long segments F1 to F9 with which were associated individual cooling circuits through which a water-alcohol mixture passed. It was possible to introduce air from either side of the barrel by means of a piston provided with a mass flow meter.

The operating conditions are given below:

Configuration of screws 1 and 2

| Segments | F1 | F2 | F3 | F4 | F5 | F6–F7 | F8–F9 |
|---|---|---|---|---|---|---|---|
| Type of screw | T | T | T | M/C | T | CO | CO |

Where T: Transport, M: Mixing, C: Shear and CO: Compression

Without air injection.

Flow rate/temperature of concentrate: 10 kg/h in F1/5° C.

Rate of rotation of screws: 400 rpm.

Diameter of die (without outlet pipe or valve): 1.2 mm

Temperature in the barrel segments and die plate:

| Segments | F1–F2 | F3 | F4–F9 | Plate |
|---|---|---|---|---|
| Temperature (° C.) | +3 to +5 | −8.5 | −10 to −11 | −8 to −10 |

The temperature of the mass on emerging from the die was −9° C.

The product obtained had an oily and creamy texture, which was not the case when the same concentrate was treated in a conventional freezer. It showed good stability on freezing with a minimum of retraction in area.

Its behaviour on thawing was also different and it melted much more slowly. It produced a much colder sensation in the mouth. The frozen concentrate was perfectly homogeneous, without solid/liquid phase separation and could be stored without adverse changes at −18° C. When it was solidified at −18° C. and brought to room temperature, the frozen concentrate retained its shape for at least 30 min., whereas the same product treated in a conventional freezer became entirely liquid in less than 15 min. Moreover, the product was stable to temperature variations.

This valuable physical stability can be used to advantage for storing an evaporated milk concentrate while waiting to use it later to manufacture milk products. In point of fact, it is no longer necessary to adapt the charge of the evaporator (which is generally a piece of equipment with a large capacity which is cumbersome to start up and in operation) to the quantity of the final milk product, which brings about better productivity.

Example 2

The procedure was as in Example 1, but with a whole milk having 4% fats which was concentrated by evaporation to 30% dry matter. The remarkable properties observed as compared with a product treated in a conventional freezer were maintained.

Example 3

The procedure was similar to that in Example 2, except that 3–5% of sucrose were added to the concentrate as well as a fruit flavouring before treatment in the extruder. The previous properties described in Example 1 were maintained. When reconstituted with 1 to 2 times the quantity of water, a flavoured milk was obtained.

Example 4

The procedure was as in Example 3, except that air was introduced into the extruder, from either side of the barrel, at about half way along the latter at a total flow rate of 20 g/h. A frozen concentrate was obtained in this way expanded 100% (increase in volume compared with the non-aerated mass).

A fruit-flavoured milk shake was obtained by adding 0.5 to 2 times the quantity of water.

Example 5

The procedure was as in example 2, except that 10% of instant cocoa (NESQUIK) was added to the concentrate before the latter was passed through the extruder and air was introduced into the extruder, from either side of the barrel, at about half way along the latter at a total flow rate of 15 g/h. A frozen concentrate was obtained in this way expanded 100%.

A cocoa-flavoured milk shake was obtained by adding 0.5 to 2 times the quantity of water.

In the preceding frozen concentrates, the mean diameters obtained of the ice crystals measured by optical microscopy at −10° C.

| Example | 2 | 5 |
|---------|-----|----|
| Dc | <30 | 34 |

In all cases, the products obtained had a more oily and creamier texture than the products manufactured with a freezer in a conventional manner.

What is claimed is:

1. A process for preparing a frozen concentrated milk comprising (i) introducing a concentrated milk having, by weight, a dry matter content of from 20% to 40% into an apparatus for extrusion of a product, wherein the apparatus comprises a barrel and a screw contained within the barrel and an extrusion-product exit die, and rotating the screw for transporting the concentrated milk through the barrel for extrusion of product through the exit die and (ii) during the transport of the concentrated milk through the extrusion apparatus, cooling the concentrated milk to a temperature of equal to or lower than −8° C. to obtain, from the exit die, frozen concentrated milk.

2. A process according to claim 1 wherein the apparatus comprises a barrel which contains two screws aligned longitudinally in parallel and the process comprises rotating the two screws for transporting the concentrated milk.

3. A process according to claim 1 or 2 wherein the concentrated milk is selected from the group consisting of a concentrated whole milk and a concentrated skim milk.

4. A process according to claim 1 or 2 wherein the concentrated milk introduced into the extrusion apparatus has a temperature of from approximately 2° C. to 7° C.

5. A process according to claim 1 or 2 wherein during transport through the extrusion apparatus, the concentrated milk is cooled to a temperature of from −8° C. to −20 C.

6. A process according to claim 1 comprising cooling the barrel to cool the concentrated milk.

7. A process according to claim 1 or 6 comprising cooling the screw to cool the concentrated milk.

8. A process according to claim 2 comprising cooling the barrel to cool the concentrated milk.

9. A process according to claim 2 or 8 comprising cooling the two screws to cool the concentrated milk.

10. A process according to claim 1 wherein the screw is rotated at a rate of from 100 rpm to 600 rpm.

11. A process according to claim 2 wherein the two screws are rotated at a rate of from 100 rpm to 600 rpm.

12. A process according to claim 2 wherein the concentrated milk transported through the extruder is not subjected to a pressure which exceeds approximately 50 bar.

13. A process according to claim 1 further comprising injecting air into the concentrated milk during the transport of the concentrated milk through the extrusion apparatus.

14. A process according to claim 13 wherein the air is injected into the concentrated milk during the transport of the concentrated milk through the extrusion apparatus for expanding the frozen milk in an amount of from 20% to 150%.

15. A process according to claim 1 wherein the concentrated milk introduced into and transported through the extruder does not contain an emulsifying agent or an agent for stabilizing the concentrated milk.

16. A process according to claim 1 or 2 comprising treating and transporting the concentrated milk through the extruder so that the frozen concentrated milk obtained from the exit die has fat globules which have a mean globule size of from about 8 microns to 20 microns.

17. A process according to claim 1 or 2 wherein the concentrated milk is transported through the extruder and cooled so that the frozen concentrated milk obtained from the exit die has ice crystals which have a mean crystal diameter size of from 10 microns to 34 microns.

18. A process according to claim 17 comprising treating and transporting the concentrated milk through the extruder so that the frozen concentrated milk obtained from the exit die has fat globules which have a mean globule size of from about 8 microns to 20 microns.

19. A process according to claim 1 wherein the concentrated milk transported through the extrusion apparatus contains a sugar added to the concentrated milk.

20. A process according to claim 1 wherein the concentrated milk transported through the extruder contains a flavoring substance added to the concentrated milk.

21. A process according to claim 20 wherein the flavoring substance is selected from the group consisting of fruit, coffee and cocoa flavoring substances.

* * * * *